United States Patent
Jang et al.

(10) Patent No.: US 12,501,094 B2
(45) Date of Patent: Dec. 16, 2025

(54) XR STREAMING SYSTEM FOR LIGHTWEIGHT XR DEVICE AND OPERATION METHOD THEREFOR

(71) Applicant: KOREA ELECTRONICS TECHNOLOGY INSTITUTE, Seongnam-si (KR)

(72) Inventors: Junhwan Jang, Paju-si (KR); Woochool Park, Incheon (KR); Minsu Choi, Seoul (KR); Junsuk Lee, Seoul (KR); Bonjae Koo, Suwon-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 195 days.

(21) Appl. No.: 18/529,607

(22) Filed: Dec. 5, 2023

(65) Prior Publication Data
US 2024/0107098 A1   Mar. 28, 2024

Related U.S. Application Data (63) Continuation of application No. PCT/KR2021/017526, filed on Nov. 25, 2021.

(30) Foreign Application Priority Data

Oct. 27, 2021   (KR) .................... 10-2021-0144554

(51) Int. Cl.
*H04N 21/266* (2011.01)
*G06T 15/00* (2011.01)
(Continued)

(52) U.S. Cl.
CPC .......... *H04N 21/266* (2013.01); *G06T 15/00* (2013.01); *G06T 19/006* (2013.01);
(Continued)

(58) Field of Classification Search
None
See application file for complete search history.

(56) References Cited

U.S. PATENT DOCUMENTS

| | | | |
|---|---|---|---|
| 2017/0186234 A1* | 6/2017 | Xu | .......... H04N 21/80 |
| 2019/0149873 A1* | 5/2019 | DiVerdi | ........... H04N 21/47217 725/38 |
| 2022/0005215 A1* | 1/2022 | Evangelista | .............. G06T 7/55 |

FOREIGN PATENT DOCUMENTS

| | | |
|---|---|---|
| KR | 10-2081364 B1 | 2/2020 |
| KR | 10-2238670 B1 | 4/2021 |

(Continued)

OTHER PUBLICATIONS

International Search Report and Written Opinion mailed Jul. 15, 2022 in International Application No. PCT/KR2021/017526. (English translation of ISR).

(Continued)

*Primary Examiner* — Junior O Mendoza
(74) *Attorney, Agent, or Firm* — Knobbe, Martens, Olson & Bear, LLP (57) ABSTRACT

Proposed are a mediation server operation method for an XR streaming service and XR streaming system supporting same, the mediation server operation method comprising the steps of: if a mediation server receives an XR content playback request from a connected user device, searching for an idle split rendering server; allocating the found idle split rendering server to the user device; receiving image data and sensor data from the user device; generating a rotation matrix on the basis of the received image data and sensor data; and transmitting the rotation matrix to the allocated split rendering server.

10 Claims, 6 Drawing Sheets

(51) Int. Cl.
*G06T 19/00* (2011.01)
*H04N 21/234* (2011.01)
*H04N 21/258* (2011.01)
*H04N 21/442* (2011.01)
*H04N 21/81* (2011.01)

(52) U.S. Cl.
CPC ..... *H04N 21/234* (2013.01); *H04N 21/25841* (2013.01); *H04N 21/44209* (2013.01); *H04N 21/8146* (2013.01)

(56) References Cited

FOREIGN PATENT DOCUMENTS

| | | |
|---|---|---|
| KR | 10-2257039 B1 | 5/2021 |
| WO | WO 2021/044593 A1 | 3/2021 |

OTHER PUBLICATIONS

Jang et al., "A Study on Edge Cloud-Based AR Split-Rendered Video Real-Time Streaming", Journal of The Institute of Electronics and Information Engineers, vol. 58, No. 6, Jun. 2021.

* cited by examiner

XR STREAMING SYSTEM FOR LIGHTWEIGHT XR DEVICE AND OPERATION METHOD THEREFOR

CROSS REFERENCE TO RELATED APPLICATIONS

This is a continuation application of International Patent Application No. PCT/KR2021/017526, filed on Nov. 25, 2021, which claims priority to Korean patent application No. KR 10-2021-0144554 filed on Oct. 27, 2021, contents of each of which are incorporated herein by reference in their entireties.

BACKGROUND

Technical Field

The present disclosure relates to XR streaming, and more specifically, to an XR streaming system and operating method for providing content for lightweight XR devices.

Description of Related Technology

Since the emergence of Virtual Reality (VR) and Augmented Reality (AR), interest in smartphone applications has increased, and Mixed Reality (MR) has been used in various fields, such as education and commercial use. Recently, Cross Reality (XR), which encompasses the above-mentioned three concepts, has been proposed.

SUMMARY

One aspect is an XR streaming system for a lightweight XR device and a method of operating the same. This allows consuming and interacting with high-quality XR content even on the lightweight XR device through improved rendering performance for video, even if relatively low-resolution video is transmitted through the lightweight XR device.

Another aspect is an XR streaming system for a lightweight XR device and a method of operating the same by implementing an expandable split rendering server and mediation server (MEC: Mobile Edge Computer). Accordingly, the lightweight XR device can consume high-quality content with minimal hardware resources by exchanging only data packaged in 2D video format with the mediation server and the split rendering server. Additionally, by introducing the expandable split rendering server, services can be efficiently provided to multiple users.

Another aspect is an XR streaming system for a lightweight XR device that includes a user device collecting and transmitting video data and sensor data; a mediation server allocating a split rendering server to the user device in response to an XR content request from the user device, configuring a rotation matrix based on the video data and the sensor data received from the user device, and delivering the rotation matrix to the split rendering server allocated to the user device; and the allocated split rendering server generating a 2D video by performing 3D rendering based on the rotation matrix received from the mediation server, and transmitting the generated 2D video to the user device.

Here, the mediation server may receive the sensor data related to a location of the user device and a pose of the user device.

In addition, the mediation server may manage split rendering servers, search for an idle split rendering server in response to the XR content request from the user device, and allocate the idle split rendering server to the user device.

Further, if there is no idle split rendering server, the mediation server may request the user device to wait for split rendering server allocation.

Meanwhile, the mediation server may perform TCP-based communication with the user device to determine whether the user device supports a QUIC communication protocol.

Additionally, the mediation server may perform UDP-based data transmission and reception with the split rendering server.

Another aspect is an operation method of a mediation server supporting an XR streaming service that includes, when the mediation server receives an XR content playback request from a connected user device, searching for an idle split rendering server; allocating the found idle split rendering server to the user device; receiving video data and sensor data from the user device; generating a rotation matrix based on the received video data and the received sensor data; and transmitting the rotation matrix to the allocated split rendering server.

Here, the method may further include, if there is no idle split rendering server, requesting the user device to wait for split rendering server allocation.

In addition, the method may further include performing TCP-based communication with the user device to determine whether the user device supports a QUIC communication protocol.

Meanwhile, the transmitting may include performing UDP-based data transmission and reception with the split rendering server.

According to the present disclosure, it supports real-time enjoyment of high-quality XR content even in a lightweight XR device at minimal cost (computing power, equipment cost, etc.).

In addition, the present disclosure improves the lightweight and compatibility of user terminal applications and minimizes network overhead, traffic, and response delay time by introducing a standard communication scheme (QUIC: Quick UDP Internet Connection) of asynchronous scheme (UDP: User Datagram Protocol) with high transfer rate, thereby providing better user experience.

Furthermore, various effects other than the effects described above may be disclosed explicitly or implicitly in the following description according to embodiments of the present disclosure.

DETAILED DESCRIPTION

To support work in a pandemic situation caused by respiratory disease, remote work systems are being applied in various forms. Currently, not only remote work but also XR technologies such as the metaverse that Roblox and Minecraft are trying to build are attracting attention.

However, the systems built to date use graphics that are clunky and out of touch with reality, and the scope of interaction is limited. Accordingly, the XR technology provided to date has not been built to the point where it can handle meetings or work, and is limited to simply providing a play space.

One of the limitations of metaverse platforms, such as the XR world described above, is related to the performance of XR devices. In relation to previous VR or AR services, VR headsets such as Oculus Quest 2 and MR equipment such as HoloLens 2 have appeared, which have made rapid progress. However, they are still inferior in terms of performance and usability (e.g., heat generation issue, etc.), and as the size of the device increases to implement high resolution, there is a problem that it is very inconvenient when used for a long time.

In order to make the features and advantages of the present disclosure clearer, the present disclosure will be described in more detail with reference to specific embodiments of the present disclosure along with the accompanying drawings.

However, in the following description and the accompanying drawings, well known techniques may not be described or illustrated in detail to avoid obscuring the subject matter of the present disclosure. Through the drawings, the same or similar reference numerals denote corresponding features consistently.

The terms and words used in the following description, drawings and claims are not limited to the bibliographical meanings thereof and are merely used by the inventor to enable a clear and consistent understanding of the disclosure. Thus, it will be apparent to those skilled in the art that the following description about various embodiments of the present disclosure is provided for illustration purpose only and not for the purpose of limiting the disclosure as defined by the appended claims and their equivalents.

Additionally, the terms including expressions "first", "second", etc. are used for merely distinguishing one element from other elements and do not limit the corresponding elements. For example, the second element may be referred to as the first element without departing from the scope of the present disclosure, and similarly, the first element may also be referred to as the second element.

In addition, the terms used herein are only examples for describing a specific embodiment and do not limit the present disclosure. The singular expressions may include plural expressions unless the context clearly dictates otherwise. Also, the terms "comprise", "include", and derivatives thereof refer to inclusion without limitation. That is, these terms are intended to specify the presence of features, numerals, steps, operations, elements, components, or combinations thereof, which are disclosed herein, and should not be construed to preclude the presence or addition of other features, numerals, steps, operations, elements, components, or combinations thereof.

Further, the terms such as "unit", "module", and the like used herein refer to a unit that processes at least one function or operation and may be implemented with hardware, software, or a combination of hardware and software. Also, the terms "a", "an", "one", "the", and similar terms may be used as both singular and plural meanings in the context of describing the present disclosure (especially in the context of the following claims) unless the context clearly indicates otherwise.

In addition to the terms described above, specific terms used in the following description are provided to aid understanding of the present disclosure, and these specific terms may be changed to other forms without departing from the scope of the present disclosure.

Also, embodiments within the scope of the present disclosure include computer-readable media having computer-executable instructions or data structures stored on computer-readable media. Such computer-readable media can be any available media that is accessible by a general purpose or special purpose computer system. By way of example, such computer-readable media may include, but not limited to, RAM, ROM, EPROM, CD-ROM or other optical disk storage, magnetic disk storage or other magnetic storage devices, or any other physical storage medium that can be used to store or deliver certain program codes formed of computer-executable instructions, computer-readable instructions or data structures and which can be accessed by a general purpose or special purpose computer system.

Now, a system, device, and method according to the present disclosure will be described in detail with reference to the accompanying drawings.

Figure 1:
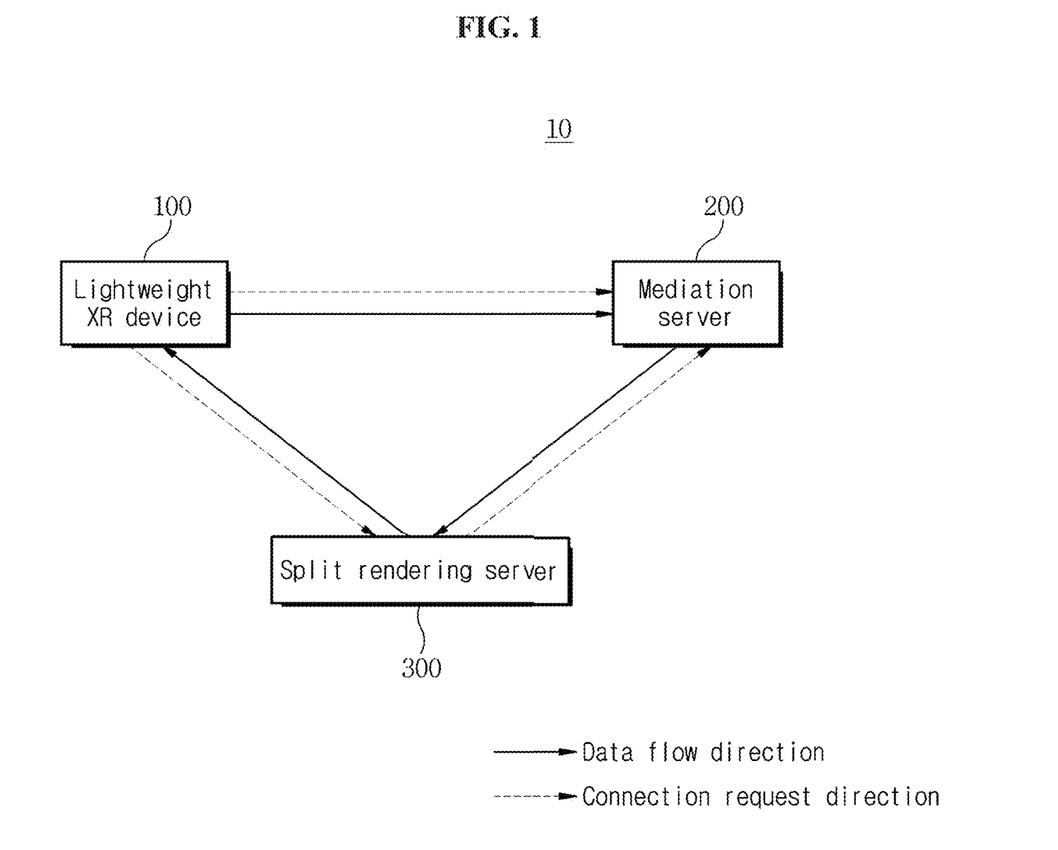
FIG. 1 is a diagram showing a configuration example of an XR streaming system according to an embodiment of the present disclosure.
Figure 2:
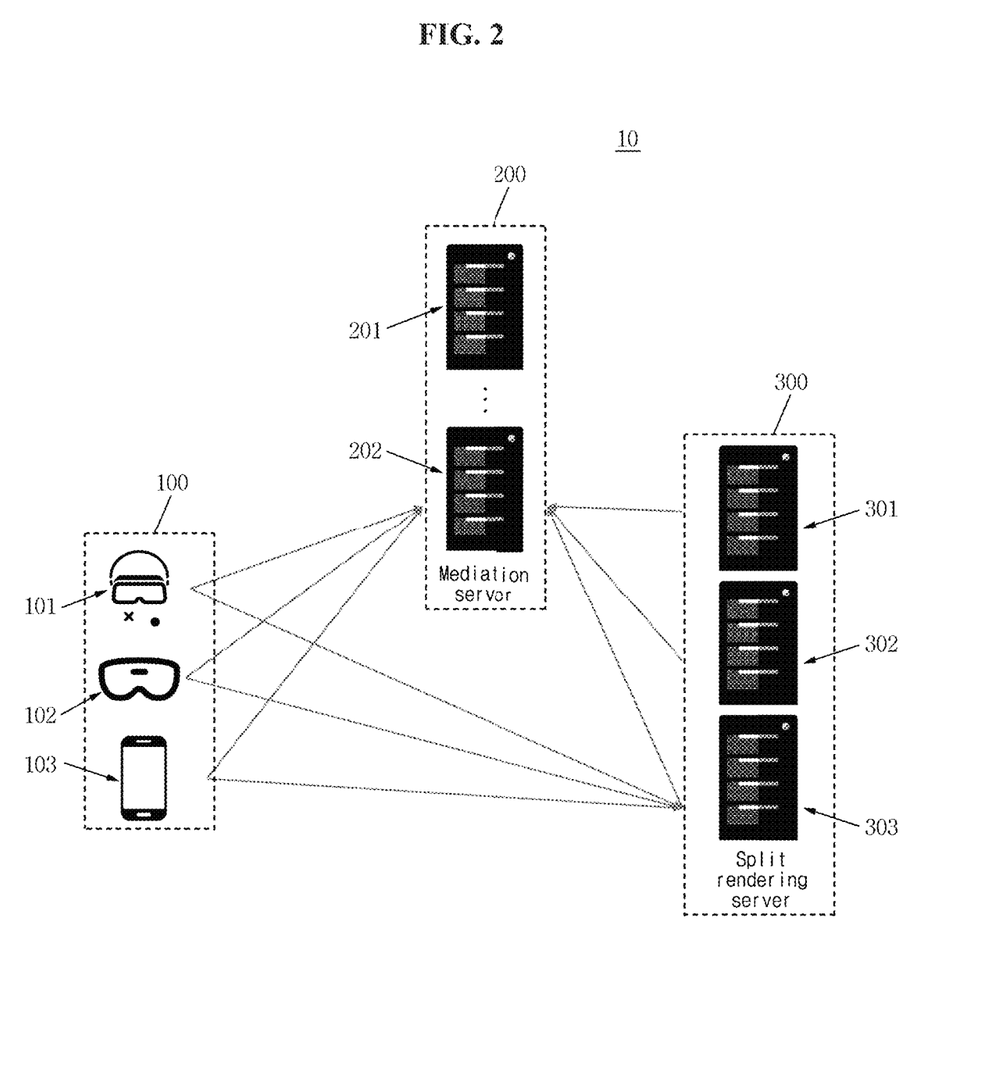
FIG. 2 is a diagram showing another configuration example of an XR streaming system of an expanded form according to an embodiment of the present disclosure.

FIG. 1 is a diagram showing a configuration example of an XR streaming system according to an embodiment of the present disclosure, and FIG. 2 is a diagram showing another configuration example of an XR streaming system of an expanded form according to an embodiment of the present disclosure.

Referring to FIGS. 1 and 2, the XR streaming system 10 according to an embodiment of the present disclosure may include a lightweight XR device 100, a mediation server 200, and a split rendering server 300. The respective devices (or devices and servers) constituting the XR streaming system 10 can exchange data by performing IP (Internet Protocol)-based communication.

The lightweight XR device 100 is a device capable of using the XR streaming system 10 and may refer to a user device that has a specified weight or less or includes a specified component (e.g., an ultra-small camera capable of collecting images of a specified resolution and having a specified weight or less, a sensor module capable of collecting sensor data related to various movements of a device wearer and having a specified weight or less, hardware having a specified weight or less, etc.). The term lightweight may refer to a configuration that includes minimal hardware resources capable of transmitting and receiving data packaged in a 2D video format with a server (or server device).

The lightweight XR device 100 may include a device capable of acquiring video regarding the user and the user's surroundings while worn by the user, and transmitting the acquired video to the mediation server 200 and the split rendering server 300. For example, the lightweight XR device 100 may include a head-mounted device 101 that can be worn on the user's head, a goggle-type device 102 that can be worn on the user's eyes, and a portable communication device 103 equipped with a camera capable of acquiring surrounding video. Alternatively, the lightweight XR device 100 refers to terminal devices that allows enjoying XR (VR, AR, MR) content, such as smartphone, VR headset, and HoloLens. The lightweight XR device 100 is capable of collecting mono or stereo video and sensor data (e.g., IMU (Inertial Measurement Unit) data values [acceleration, rotation speed, magnetometer, etc.]). The lightweight XR device 100 is capable of transmitting collected data (e.g., video data and sensor data) to the mediation server 200 and receiving a 2D video from the split rendering server 300. The lightweight XR device 100 is capable of processing and reproducing video received from the split rendering server 300 based on compression and split schemes according to predefined standards. The lightweight XR device 100 makes a connection request to the split rendering server 300 while requesting a connection to the mediation server 200, so it has a total of two connections, one to each server. Upon forming communication channels with the mediation server 200 and the split rendering server 300, the lightweight XR device 100 can transmit its own identification information to each server.

Upon receiving a connection request from the lightweight XR device 100, the mediation server 200 can form a communication channel with the lightweight XR device 100 that requested the connection. The mediation server 200 can receive image data and sensor data from the lightweight XR device 100 with which the communication channel has been formed. Meanwhile, upon receiving a connection request from the split rendering server 300, the mediation server 200 can form a communication channel with the split rendering server 300 that requested the connection. The mediation server 200 can transmit the image data and sensor data received from the lightweight XR device 100 to the split rendering server 300. That is, the mediation server 200 can manage both the lightweight XR device 100 and the split rendering server 300 by treating them as clients. One mediation server 200 may form communication channels with a plurality of lightweight XR devices 100 and a plurality of split rendering servers 300 and perform mediation of image data and sensor data. Alternatively, a plurality of mediation servers 200 may be provided, and each mediation server may process data mediation between one lightweight XR device 100 and one split rendering server 300. As the mediation server 200 may have connections with multiple split rendering servers 300, the mediation server 200 can perform the role of connection management such as allocating an idle split rendering server to a user device (e.g., the lightweight XR device 100). The mediation server 200 and the split rendering server 300 may use a UDP-based communication protocol, and the UDP-based communication protocol is based on IETF QUIC. IETF QUIC is a communication protocol adopted in HTTP 3.0 and is a next-generation standard communication protocol.

The split rendering server 300 is a client that makes a connection request to the mediation server 200, but since it receives a connection request from the lightweight XR device 100, it also performs the role of a server. The split rendering server 300 may have a connection only with one mediation server 200 and may have connections with several user devices (e.g., the lightweight XR devices 100).

Figure 3:
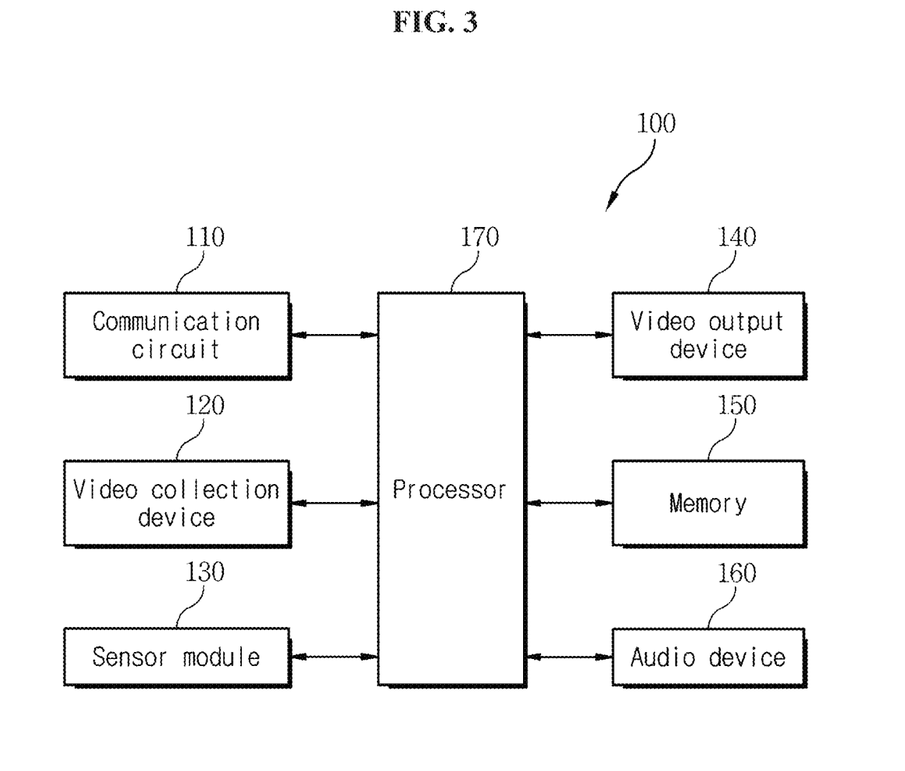
FIG. 3 is a diagram showing a configuration example of a lightweight XR device according to an embodiment of the present disclosure.

FIG. 3 is a diagram showing a configuration example of a lightweight XR device according to an embodiment of the present disclosure.

Referring to FIG. 3, the lightweight XR device 100 according to an embodiment may include a communication circuit 110, a video collection device 120, a sensor module 130, a video output device 140, a memory 150, an audio device 160, and a processor 170.

The communication circuit 110 may support a communication function of the lightweight XR device 100. The communication circuit 110 may form a communication channel with the mediation server 200 in response to a user's manipulation, and transmit video data collected by the video collection device 120 and sensor data collected by the sensor module 130 to the mediation server 200. Additionally, the communication circuit 110 may form a communication channel with the split rendering server 300 in response to a user's manipulation and receive XR streaming data from the split rendering server 300.

The video collection device 120 may include a camera capable of collecting video in a certain direction. Additionally, the video collection device 120 may also collect surrounding audio signals. The video collection device 120 may transmit video data acquired in real time to the mediation server 200 in response to the control of the processor 170.

The sensor module 130 may generate sensor data corresponding to various movements of the lightweight XR device 100, and transmit the generated sensor data to the mediation server 200 in response to the control of the processor 170. The sensor module 130 may be composed of a plurality of sensors capable of collecting various sensor data related to the location and movement of the user wearing the lightweight XR device 100, such as an acceleration sensor, a gyro sensor, a proximity sensor, an illuminance sensor, an altitude sensor, and a location information collection sensor.

The video output device 140 may be a device that supports a screen display function of the lightweight XR device 100. For example, the video output device 140 may include a display, a projection device, or the like. The video output device 140 may output a connection screen according to connection to the mediation server 200, a screen displaying XR streaming data provided by the split rendering server 300, and the like.

The memory 150 may store various data related to the XR streaming service of the present disclosure. For example, the memory 150 may temporarily or semi-permanently store the video data collected by the video collection device 120 and the sensor data collected by the sensor module 130, and transmit the stored video data and sensor data to the mediation server 200 in response to the control of the processor 170. The memory 150 may temporarily store the XR streaming data from the split rendering server 300, and transmit it to the video output device 140 in response to the control of the processor 170.

The audio device 160 may be responsible for audio signal processing of the lightweight XR device 100. In this regard, the audio device 160 may include at least one microphone and at least one speaker. The microphone may be activated to collect surrounding audio signals while the video collection device 120 is collecting videos. The speaker may output audio signals included in the XR streaming data while outputting the XR streaming data received from the split rendering server 300 to the video output device. If the XR streaming data does not include an audio signal, the speaker may stop outputting audio signals or output a designated audio signal or a music-related audio signal.

The processor 170 may control collecting, storing, transmitting, receiving, and processing data related to the operation of the lightweight XR device 100. For example, the processor 170 may control the communication circuit 110 in response to a user's manipulation so as to form a communication channel with the mediation server 200, receive an XR streaming content list from the mediation server 200, and output it to the video output device 140. When specific content is selected according to a user's selection, the processor 170 may activate the video collection device 120 and the sensor module 130 as necessary, and transmit the collected image data and sensor data to the mediation server 200. Upon receiving the XR streaming data from the split rendering server 300, the processor 170 may process the decompression and playback of the received data.

Figure 4:
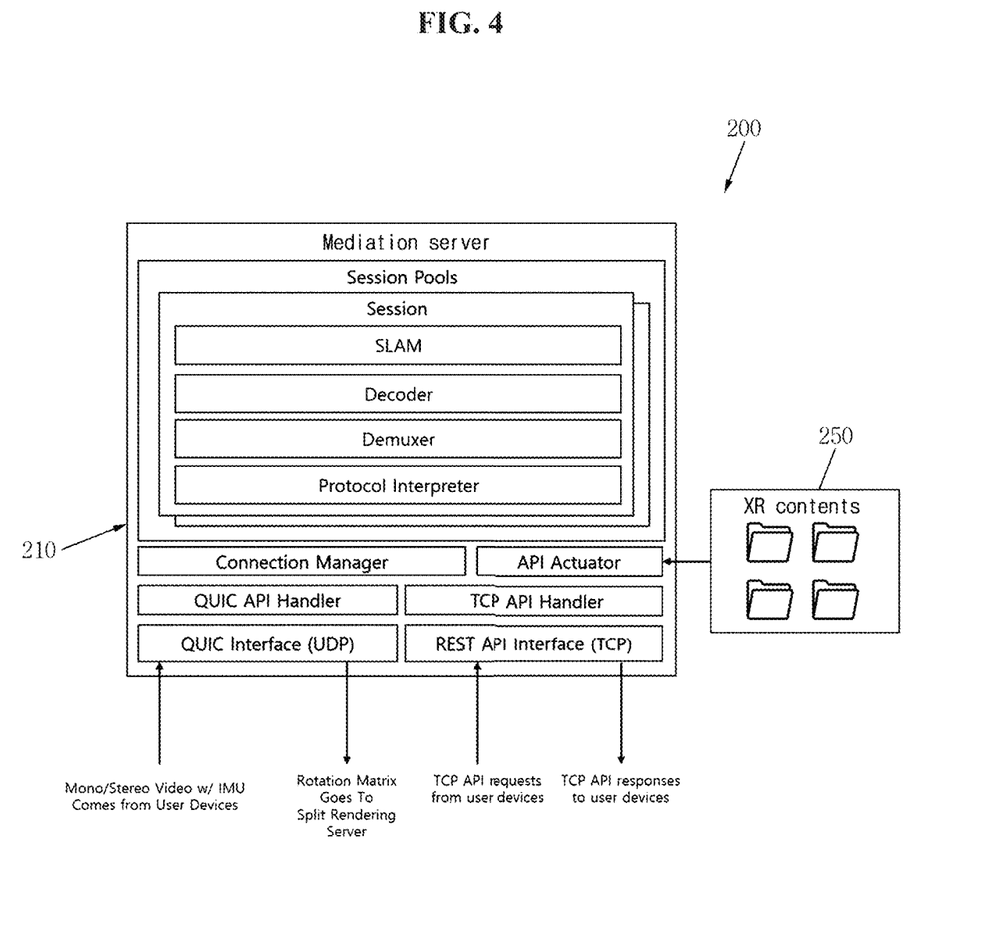
FIG. 4 is a diagram showing a configuration example of a mediation server according to an embodiment of the present disclosure.
Figure 5:
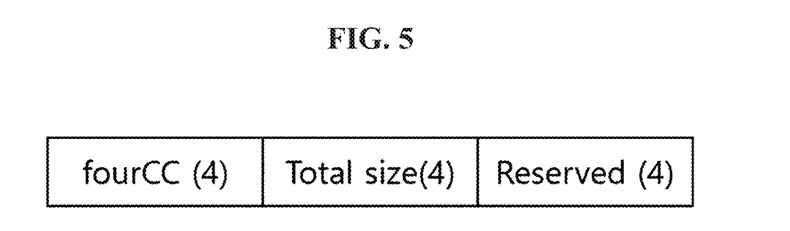
FIG. 5 is a diagram showing an example of an XR streaming platform QUIC packet header according to an embodiment of the present disclosure.

FIG. 4 is a diagram showing a configuration example of a mediation server according to an embodiment of the present disclosure, and FIG. 5 is a diagram showing an example of an XR streaming platform QUIC packet header according to an embodiment of the present disclosure.

Referring to FIG. 4, the mediation server 200 according to an embodiment may include a first server communication circuit 210 and a first storage device 250.

The first server communication circuit 210 may include a REST API interface, a TCP API handler, an API actuator, a QUIC interface, a QUIC API handler, and a connection manager. The REST API interface (TCP) is a communication protocol based on HTTP 1.1/2.0 and is an initial access point through which the lightweight XR device 100 connects to the mediation server. Through this protocol, the lightweight XR device 100 can check a list of contents currently provided on the platform, and can find out information such as whether the lightweight XR device 100 can use the XR streaming service. Currently, not all lightweight XR devices 100 can support the QUIC communication protocol, so information such as service availability is delivered through the existing TCP-based communication. Therefore, while the lightweight XR device 100 and the mediation server 200 use two types of communication schemes, TCP and UDP, the split rendering server 300 supports only the UDP scheme. The TCP API handler detects a header of a packet to determine which API service was called, and delivers necessary factors to the API actuator. The API actuator directly accesses system resources and performs CRUD (create, read, update, delete) operations, depending on the type of API service requested. For example, the API actuator may access an XR content service root directory, scan all content directories, read metadata, and output serviceable items in the form of a list. The QUIC interface (UDP) is an external interface that supports the IETF QUIC protocol for low-latency data transmission, and performs the following operations based on the detected QUIC event. The XR streaming platform does not support 1:1 responses to transmitted requests in order to minimize transmission delay. The QUIC API handler performs application-level encapsulation and decapsulation to convert data into a form that can be used internally according to the installed code. The code is defined in the form of up to 4 characters, and the structure of the packet header including the code is as shown in FIG. 5. Referring to FIG. 5, the XR streaming platform QUIC packet header may include a fourCC field, a Total size field, and a Reserved field. The fourCC field is a field that contains a code of up to 4 characters, and the types of codes may include pose, get, colr, dpth, occ_, and mdia. In this case, pose is rotation matrix information, get defines an operation with a request-response model on the quic protocol, colr refers to data with a color value among point cloud data, dpth refers to data with a depth value among point cloud data, occ_ refers to data with a transparency value among point cloud data, and mdia refers to general 2D video transmission. The connection manager is responsible for mediating the connection between the lightweight XR device 100 and the split rendering server 300. The connection manager allocates an idle split rendering server to the lightweight XR device 100, and allocates a split rendering server whose service with clients has ended back to a standby pool. A table containing information about the lightweight XR devices 100 and the split rendering servers matched to each other is internally managed, and terminated clients are periodically deleted from the table.

In addition, the first server communication circuit 210 can perform various controls to support the XR streaming service of the connected lightweight XR device 100. For example, the first server communication circuit 110 may establish a session with the lightweight XR device 100 and the split rendering server 300, transmit and receive data through the session, and terminate the session. The first server communication circuit 210 operates session pools, and each session pool may include a session item. The session pools are containers that manage the connections of the lightweight XR device 100, and do not have any separate function. The session refers to a connection session with the lightweight XR device 100, and includes one protocol interpreter, demuxer, decoder, slam module, etc. per user device. The protocol interpreter interprets the code delivered through the QUIC API handler and performs the following actions for each code. If the interpreted code is colr, dpth, occ_, or mdia, the data is delivered to the demuxer module assigned to each channel. Pose is a code used in a direction of transmitting data from the mediation server 200 to the split rendering server 300. The demuxer is responsible for converting video data divided into chunks (multiple frames) into a general video format and reconstructing it. The decoder decodes video compressed by a standard codec and converts it into data usable by the SLAM module. The SLAM (Simultaneous Localization and Mapping) is a module that calculates the location and pose information of the lightweight XR device 100, uses mono/stereo video and IMU information (or sensor data) from the decoder as input sources, and outputs in the form of a 4×4 rotation matrix. When the matrix is delivered from the SLAM module, the session creates a data stream through a connection to the split rendering server 300, encapsulates the data through the QUIC API handler, and transmits it to the split rendering server 300.

Figure 6:
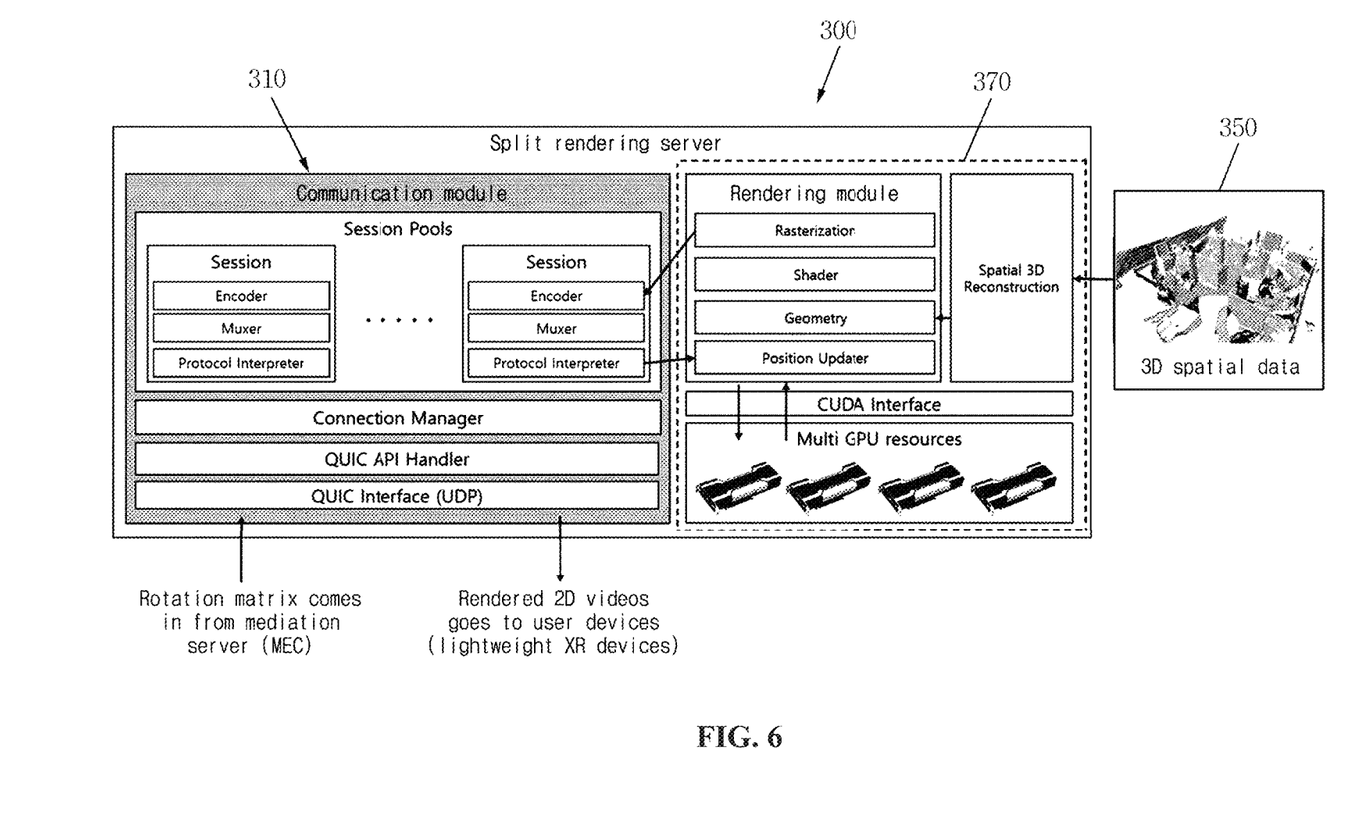
FIG. 6 is a diagram showing a configuration example of a split rendering server according to an embodiment of the present disclosure.

FIG. 6 is a diagram showing a configuration example of a split rendering server according to an embodiment of the present disclosure.

Referring to FIG. 6, the split rendering server 300 according to an embodiment may include a second server communication circuit 310, a second storage device 350, and a processing hardware device 370.

The second server communication circuit 310 may include session pools, a connection manager, a QUIC API handler, and a QUIC interface (UDP), similar to the mediation server 200 described above. The QUIC interface of the split rendering server 300 may perform the same role and function as the QUIC interface of the mediation server 200. Additionally, the QUIC API handler of the split rendering server 300 may perform the same role and function as the QUIC API handler of the mediation server 200. The connection manager performs the same role and function as the mediation server 200, but a managed connection target is only the lightweight XR device 100. The session pools of the split rendering server 300 may perform the same role and function as the session pools of the mediation server 200. The session of the split rendering server 300 may be composed of an encoder, a muxer, and a protocol interpreter. The protocol interpreter of the split rendering server 300 performs the same role and function as the protocol interpreter of the mediation server 200, but when data with a pose code is received from the mediation server 200, the corresponding information is delivered to the processing hardware device 370 (e.g., rendering module). The muxer serves to divide the encoded video into chunks (multiple frames), and the scheme used for division and assembly in the muxer may be a CMAF (Common Media Application Format) standard scheme. The encoder of the split rendering server 300 performs the role of compressing the raw video with a standard codec (H.264 or a similar codec). The source of the video is received from the rendering module.

The second storage device 350 stores 3D spatial data. The second storage device 350 provides 3D spatial data in response to a request from the processing hardware device 370.

The processing hardware device 370 performs rendering on 3D spatial data stored in the second storage device 350. The processing hardware device 370 may include a rendering module, a spatial 3D reconstruction, a CUDA interface, and multi GPU resources. The multi GPU resources are used to create and transmit video at high speed and, in this platform, are configured to create video at high speed by utilizing the hardware encoder included in the GPU. Since the number of encoders that can be used for each GPU is different, the rendering module can select the GPU according to the type and scale of the service. The CUDA Interface is an interface that allows the use of GPU resources, and may include SDK distributed by NVIDIA. The spatial 3D reconstruction is a module that retrieves 3D spatial information collected in the form of point cloud and reprocesses it into a form that can be used in the internal rendering module. The rendering module updates the pose information of the lightweight XR device 100 transmitted through the protocol interpreter in real time in the restored 3D space and generates a 2D video through a rendering pipeline (geometry, shader, rasterization) according to the appropriate viewpoint. The output of the rendering module is the 2D video, which is delivered to the encoder and finally transmitted to the lightweight XR device 100.

Figure 7:
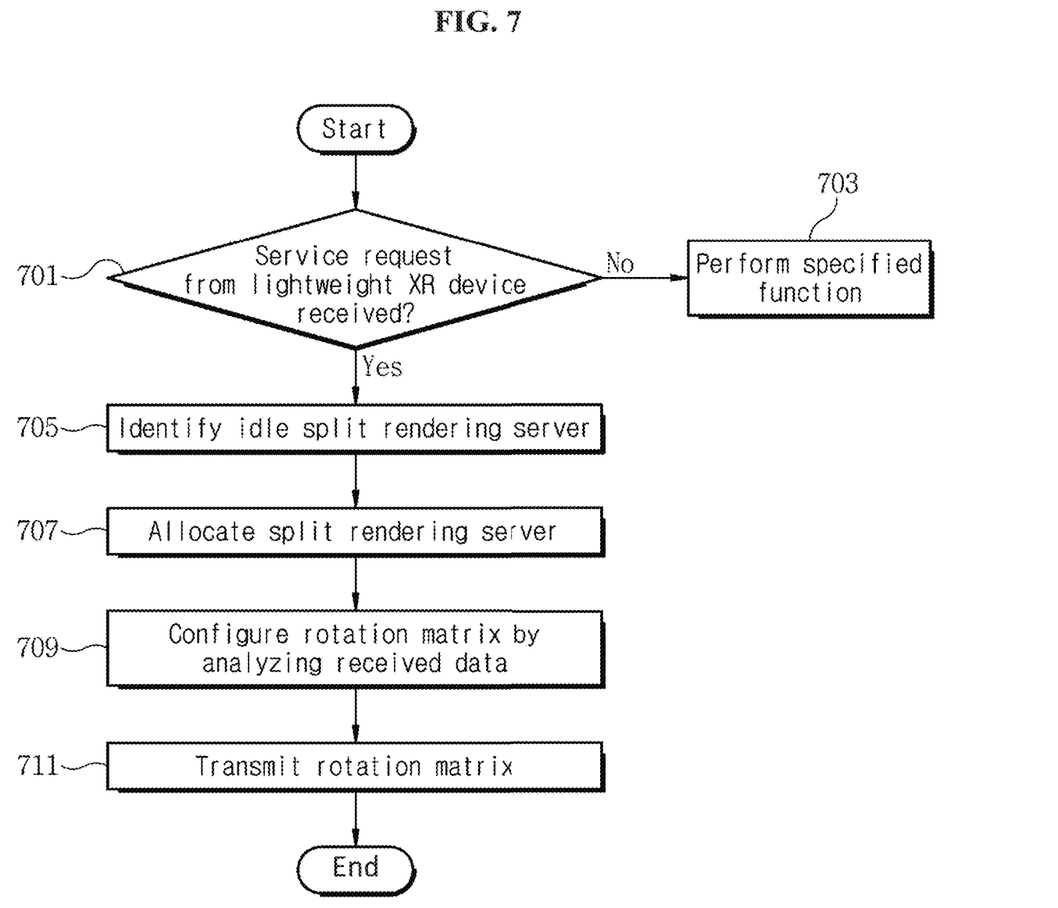
FIG. 7 is a diagram showing an example of an operation method of a mediation server in an XR streaming system according to an embodiment of the present disclosure.

FIG. 7 is a diagram showing an example of an operation method of a mediation server in an XR streaming system according to an embodiment of the present disclosure.

Referring to FIG. 7, in step 701, the mediation server 200 may check whether an XR streaming service request from the lightweight XR device 100 is received. If there is no request for XR streaming service from the lightweight XR device 100, the mediation server 200 may process a specified function in step 703. For example, the mediation server 200 may provide an XR content list to the connected lightweight XR device 100. Alternatively, the mediation server 200 may process service support for XR streaming of other lightweight XR device that have previously requested a service. In the process of receiving a service request, the mediation server 200 may check whether the lightweight XR device 100 can use the QUIC interface through TCP-based communication. To this end, the mediation server 200 may use two types of communication methods TCP and UDP with the lightweight XR device 100.

If there is a request for XR streaming service from the lightweight XR device 100 in step 701, the mediation server 200 may identify an idle split rendering server among split rendering servers in step 705. In this regard, the mediation server 200 may form communication channels with the split rendering servers and process the creation and maintenance of a table for managing the split rendering servers having the communication channels formed. The table management regarding the split rendering servers 300 of the mediation server 200 may be performed based on device information provided by the split rendering servers 300.

In step 707, the mediation server 200 may allocate an idle split rendering server to the lightweight XR device 100. If there is no idle split rendering server, the mediation server 200 may request the lightweight XR device 100 to wait for allocation of a split rendering server.

In step 709, the mediation server 200 may configure a rotation matrix by analyzing information received from the lightweight XR device 100 and calculating the location and pose of the lightweight XR device. In step 711, the mediation server 200 may generate a data stream corresponding to the rotation matrix and transmit it to the allocated split rendering server. In this process, the mediation server 200 may process data transmission based on the UDP scheme.

As described above, although this specification contains details of numerous specific implementations, these should not be construed as limitations on the scope of the invention or what may be claimed, but rather as features that may be specific to particular embodiments of the invention.

Also, although the drawings illustrate operations performed in a certain order, it should not be construed that the operations are required to be performed sequentially or in that order, which is illustrated to obtain a preferable result, or that all of the illustrated operations are required to be performed. In some cases, multi-tasking and parallel processing may be advantageous. Also, it should not be construed that the division of various system components are required in all types of implementation. It should be understood that the described program components and systems are generally integrated as a single software product or packaged into a multiple-software product.

This description shows the best mode of the present disclosure and provides examples to illustrate the present disclosure and to enable a person skilled in the art to make and use the present disclosure. The present disclosure is not limited by the specific terms used herein. Based on the above-described embodiments, one of ordinary skill in the art can modify, alter, or change the embodiments without departing from the scope of the present disclosure.

Accordingly, the scope of the present disclosure should not be limited by the described embodiments and should be defined by the appended claims.

What is claimed is:

1. A cross reality (XR) streaming system comprising:
    a user device configured to collect and transmit video data and sensor data;
    a mediation server configured to:
        allocate a split rendering server to the user device in response to an XR content request from the user device,
        configure a rotation matrix based on the video data and the sensor data received from the user device, and
        deliver the rotation matrix to the split rendering server allocated to the user device; and
    the allocated split rendering server configured to generate a 2D video by performing 3D rendering based on the rotation matrix received from the mediation server, and transmitting the generated 2D video to the user device.

2. The XR streaming system of claim 1, wherein the mediation server is configured to receive the sensor data related to a location of the user device and a pose of the user device.

3. The XR streaming system of claim 1, wherein the mediation server is configured to manage split rendering servers, search for an idle split rendering server in response to the XR content request from the user device, and allocate the idle split rendering server to the user device.

4. The XR streaming system of claim 1, wherein in response to there being no idle split rendering server, the mediation server is configured to request the user device to wait for split rendering server allocation.

5. The XR streaming system of claim 1, wherein the mediation server is configured to perform transmission control protocol (TCP)-based communication with the user device to determine whether the user device supports a quick user datagram protocol (UDP) Internet Connection (QUIC) communication protocol.

6. The XR streaming system of claim 1, wherein the mediation server is configured to perform user datagram protocol (UDP)-based data transmission and reception with the split rendering server.

7. An operation method of a mediation server supporting a cross reality (XR) streaming service, the method comprising:
in response to the mediation server receiving an XR content playback request from a connected user device, searching for an idle split rendering server;
allocating the found idle split rendering server to the user device;
receiving video data and sensor data from the user device;
generating a rotation matrix based on the received video data and the received sensor data; and
transmitting the rotation matrix to the allocated split rendering server.

8. The method of claim 7, further comprising:
in response to there being no idle split rendering server, requesting the user device to wait for split rendering server allocation.

9. The method of claim 7, further comprising:
performing transmission control protocol (TCP)-based communication with the user device to determine whether the user device supports a quick user datagram protocol (UDP) Internet Connection (QUIC) communication protocol.

10. The method of claim 7, wherein the transmitting includes performing user datagram protocol (UDP)-based data transmission and reception with the split rendering server.

* * * * *